United States Patent
Pierre (10) Patent No.: US 7,423,933 B2
(45) Date of Patent: Sep. 9, 2008

(54) METHOD FOR VISUALIZATION OF ECHOES RECEIVED BY AN ACTIVE SONAR USING A LINE SPECTRUM EMISSION

(75) Inventor: Alinat Pierre, Vence (FR)

(73) Assignee: Thales (FR)

( * ) Notice: Subject to any disclaimer, the term of this patent is extended or adjusted under 35 U.S.C. 154(b) by 158 days.

(21) Appl. No.: 10/584,279

(22) PCT Filed: Dec. 6, 2004

(86) PCT No.: PCT/EP2004/053281

§ 371 (c)(1),
(2), (4) Date: Jun. 23, 2006

(87) PCT Pub. No.: WO2005/071436

PCT Pub. Date: Aug. 4, 2005

(65) Prior Publication Data

US 2007/0147172 A1    Jun. 28, 2007

(30) Foreign Application Priority Data

Dec. 24, 2003 (FR) .................................. 03 15353

(51) Int. Cl.
*G01S 15/52* (2006.01)
(52) U.S. Cl. .................... 367/107; 367/94; 367/100
(58) Field of Classification Search ................ 367/94, 367/100, 101, 107
See application file for complete search history.

(56) References Cited

U.S. PATENT DOCUMENTS

| 4,195,359 A | * | 3/1980 | Miller et al. ................ 367/94 |
| 5,455,806 A | | 10/1995 | Hutson et al. |
| 5,481,504 A | | 1/1996 | Rosenbach et al. |
| 6,501,705 B1 | | 12/2002 | Hong et al. |

FOREIGN PATENT DOCUMENTS

FR    2 853 417 A    10/2004

OTHER PUBLICATIONS

Patent Abstract of Japan JP 2001 133540 A Mar. 9, 2001.
Patent Abstract of Japan JP 03 163385 A Oct. 16, 1991.

* cited by examiner

*Primary Examiner*—Ian J Lobo
(74) *Attorney, Agent, or Firm*—Lowe Hauptman Ham & Berner, LLP (57) ABSTRACT

The invention relates to a method for the visualisation in a single image of the useful information obtained by the operation of an active sonar with line spectrum emission. The method permits an operator to simultaneously view the echoes which may need monitoring and the trace left by the sonar wave reverberation, seabed, surface or volume reverberation. Said method comprises at least three phases: one phase for Doppler processing (71) particularly for differentiation of the fixed echoes from mobile echoes, a step for generation (72) of an artificial sonar image positioning the detected echoes in a direction/distance plane, a step (73) comprising the replacement in the artificial image of a representation derived from the reverberation, in particular of that from the marine bed. Said method is particularly suitable for sonar systems using the Doppler effect to characterise the received echoes.

5 Claims, 8 Drawing Sheets

METHOD FOR VISUALIZATION OF ECHOES RECEIVED BY AN ACTIVE SONAR USING A LINE SPECTRUM EMISSION

CROSS-REFERENCE TO RELATED APPLICATIONS

The present Application is based on International Application No. PCT/EP2004/053281, filed on Dec. 6, 2004, which in turn corresponds to FR 03/15353 filed on Dec. 24, 2003, and priority is hereby claimed under 35 USC §119 based on these applications. Each of these applications are hereby incorporated by reference in their entirety into the present application.

FIELD OF THE INVENTION

The invention described and claimed in the present document is aimed at a method making it possible to visualize on a single image the useful information obtained by the implementation of an active sonar with line spectrum emission. This method allows an operator to simultaneously view the echoes that may represent a danger and therefore requiring monitoring, as well as the reverberation and in particular that due to reflections on the bed which is often the greatest impediment. This method is in particular intended for sonar systems utilizing the Doppler effect to characterize the echoes received.

BACKGROUND OF THE INVENTION

Active sonars emit signals which, in reality, have a limited duration T and occupy a frequency band B which is likewise limited. These band and duration characteristics, can be exploited to obtain an amplitude processing gain, dependent on the product B*T, and an ability to separate the signals received in the time domain, with a resolution dependent on 1/B and in the frequency domain with a resolution dependent on 1/T. More precisely for each sonar it is possible to define an ambiguity function which represents its ability to distinguish echoes originating from closer or more distant sources (the distance being manifested by a propagation delay) and going more or less quickly (the speed being manifested on account of the Doppler effect by modification of the frequency spectrum).

Broadband signals exhibit the benefit of allowing detection, distance estimation and distance resolving power that are all the better the broader the band. Among these broadband signals, signals modulated hyperbolically in frequency have the advantage of being insensitive to Doppler impairment: stated otherwise even affected by the Doppler effect, the reflected signal is in the image of the signal emitted and a target will be detected by the same detector regardless of its speed, the processing gain being unchanged. However, this insensitivity is accompanied by a "Doppler-delay" uncertainty which has the consequence that, without information about the distance, one does not know precisely how to estimate the speed and conversely.

The line spectrum signals have on the contrary the advantage of separating echoes well as a function of the relative speed of the sonar and of the targets, the Doppler effect being manifested by a shift or "slip" of the frequency of the signal received with respect to the frequency emitted. This property is especially utilized to combat reverberation noise. The reverberation results from the reflection of the signal on multiple heterogeneities in suspension or on the bed or else on the surface. These reflectors being fixed the corresponding signals received in a channel of the sonar are affected by a Doppler which depends only on the speed of the carrier and the direction pointed at by the reception channel of the sonar. For a mobile target the same holds but the Doppler effect is increased on account of the target's own speed with respect to the carrier. By simple filtering it is thus possible to differentiate an echo from the reverberation and to estimate the relative speed of the target that returned this echo provided that the frequency resolution of the sonar is sufficient.

Contemporary sonars generally operate according to one or other of these modes by emitting either broadband signals, or line spectrum signals. Thus application FR 03 04042 filed on Jan. 4, 2003 by the Applicant, describes a sonar which simultaneously uses the properties of frequency modulated signals and of signals with high Doppler resolution such as BPSK signals.

Sonars with line spectrum emissions make it possible to easily apply a Doppler processing to the signals received and to perform the classification of the echoes received, not only through the intensity of the corresponding signals received, but also through their Doppler frequencies. With respect to the carrier of the sonar, an echo is then characterized by three parameters, its distance with respect to the carrier, the bearing in which it is situated and its speed of displacement. The bearing may be defined as the angle made by the direction joining the sonar to the object whose echo is received with the heading of the carrier ship.

The speed parameter is in particular important for determining whether the object detected is liable to represent any threat for the carrier of the sonar. It also advantageously allows an improvement in the contrast. Specifically the echo reflected by a mobile target of small size situated in a zone of strong panoramic reverberation of the seabed, is invisible with a broad spectrum emission since its level is too low with respect to the level attained by the reverberation signal which uniformly covers the entire band. On the other hand, it may easily be separated from the ambient clutter constituted by the panoramic reverberation, by virtue of the frequency displacement due to the Doppler which results from the speed of the target. It may thus be detected and isolated.

However, the use of the Doppler parameter presents the operator with a problem of viewing the information received. Specifically in the absence of Doppler analysis, each echo may be portrayed on a plane, as a point, or a small surface, having two coordinates: its bearing and its distance. It is therefore possible, on the basis of a conventional viewing screen, to represent the echoes received. This representation may for example take the form of luminous spots whose position and size reflect the position and the size of the objects that have returned an echo. The level of the echo received being for example rendered by the intensity of the luminous spot, it is simple to make provision to acquire the parameters of a target by simple pointing of the corresponding echo.

On the other hand if a Doppler characterization of the echoes is carried out, each echo is then identified by three coordinates: its bearing, its distance and its Doppler frequency. A simple representation in a plane is then no longer possible.

Figure 2:
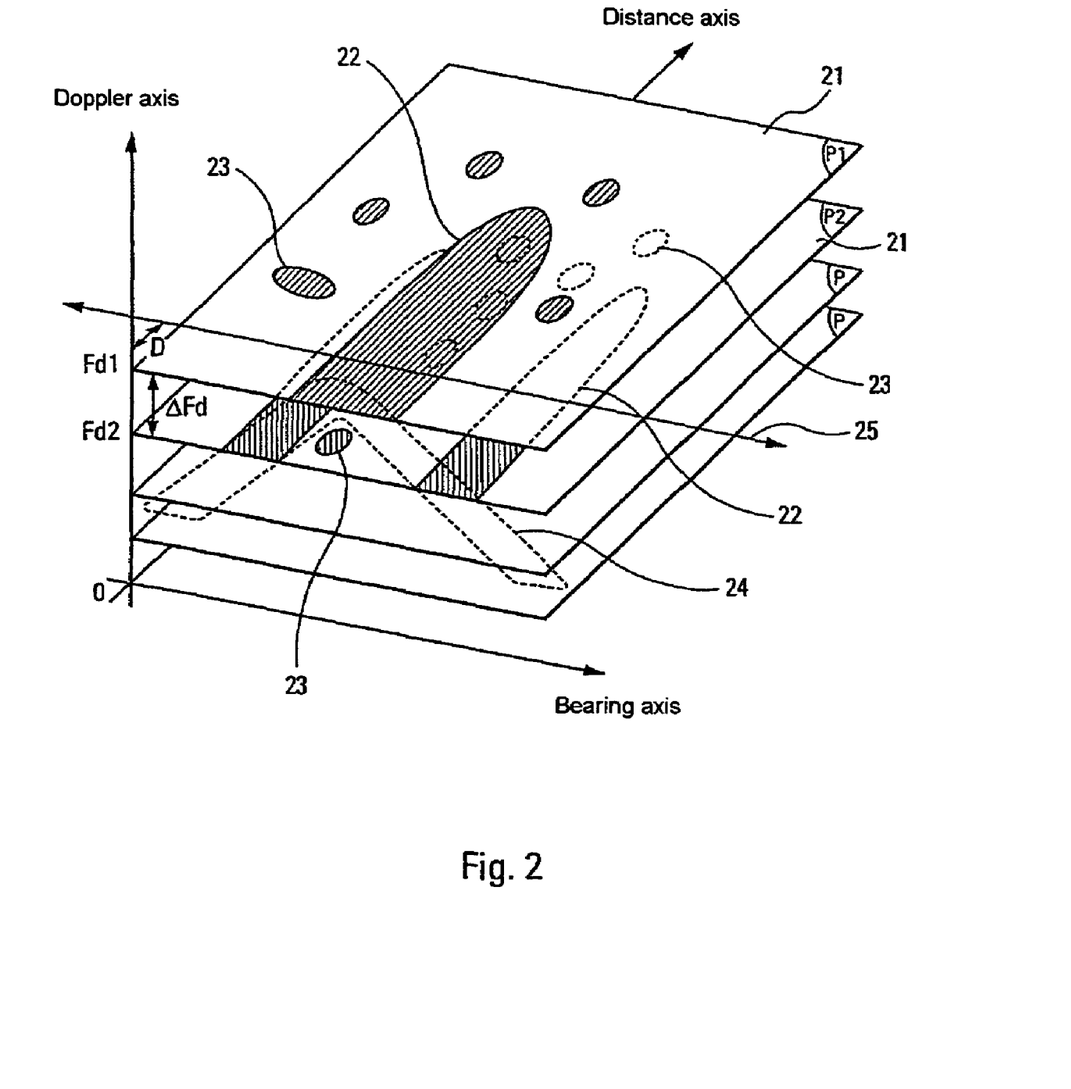
FIG. 2, an exemplary representation in three dimensions of sonar echoes characterized by their distance, their bearing and their Doppler frequency.

A first solution then consists in representing the echoes detected in a three dimensional space. For this purpose it is for example possible to use a perspective representation, carried out along three axes, a distance axis, a bearing axis and a Doppler axis. Such a representation is illustrated by FIG. 2. However, although exhibiting the advantage of allowing simultaneous representation of all the echoes received, the perspective representation exhibits serious drawbacks. Firstly it requires the use of special screens that are more complex and more expensive than straightforward conventional viewing screens. Next, such a representation renders the operations performed by the operators in charge of the sonar, such as the designation, by means of a cursor for example, of an echo displayed on the screen, more complex. Finally, in the case where a large number of echoes are received, the perspective representation loses its legibility.

A second solution, known from the prior art and commonly used, consists in simultaneously utilizing two simultaneous plane images. A first image, such as those of FIGS. 3 and 4, carries out the displaying of the echoes received having one and the same Doppler frequency, in a conventional bearing-distance plane. The desired Doppler frequency is selected by the operator. Such an image makes it possible to simultaneously view all the echoes having one and the same Doppler frequency. On the other hand the echoes exhibiting another Doppler frequency are not represented. The visual analysis of the echoes is therefore done by successive explorations of the various images available.

Figure 5:
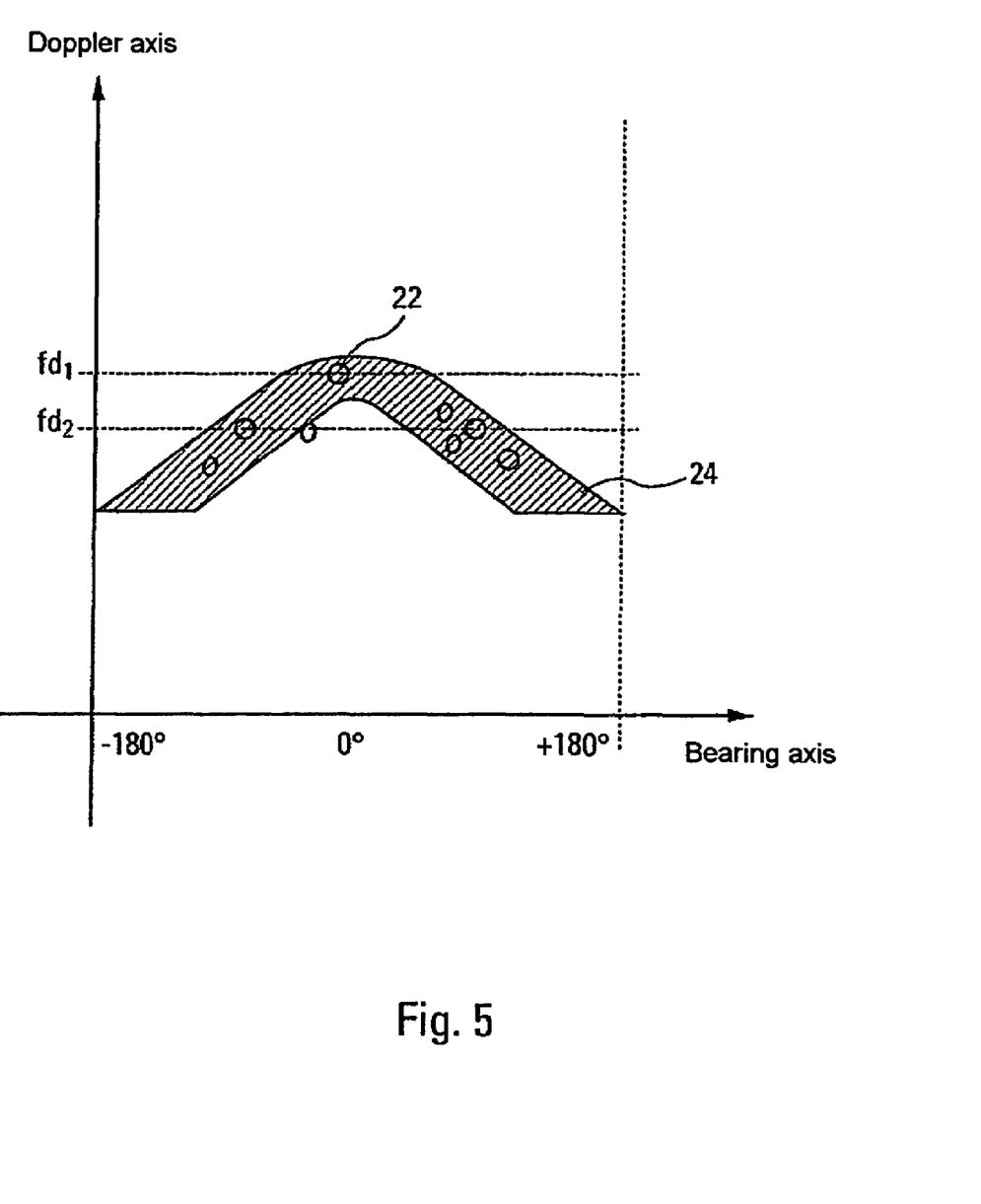
FIG. 5, the diagrammatic representation illustrating a plane image corresponding to the displaying, in a bearing-Doppler plane, of the echoes received and situated at one and the same distance D mentioned in FIG. 2.

The representation in the bearing-distance plane is supplemented with a second image, such as that of FIG. 5, in a bearing-Doppler plane. This second image makes it possible to view the whole set of echoes situated at a given distance, regardless of their Doppler frequency in the Doppler span covered by the sonar. This distance is moreover selected by the operator. This second solution which consists of a page-wise visualization, has the advantage of being compatible with commonly used viewing screens. On the other hand on account of the fact that it requires the successive exploration of a large number of images in two different planes, it is lengthy and irksome for the operator to implement, even if the switch from the representation in one plane to the representation in the other plane is generally made easier by the implementation of computer tools. It is the cause of a certain number of interpretation errors especially as regards the detection of an object of relatively small size moving in zones of strong reverberation. Moreover such a representation does not allow global visualization of the panoramic reverberation of seabeds, the echoes manifesting this reverberation being distributed over all the images, as a function of their Doppler frequency. To be able to analyze each image properly, the operator must then perform a mental recomposition of the panoramic reverberation.

SUMMARY OF THE INVENTION

To alleviate these difficulties the method according to the invention proposes another way of utilizing the Doppler information. The method according to the invention performs, on the basis of a line spectrum emission, the recomposition of a synthetic plane image presented in a bearing-distance plane. This synthetic image represents in a differentiated manner the echoes detected and portrays in the form of zones of variable extents the acoustic signals originating from the various reverberation forms, in particular that of the bed.

For this purpose the method according to the invention comprises several steps. A first step of Doppler processing of the sonar signal received, which makes it possible to class the echoes received as a function of the Doppler frequency. The echoes are in particular classed into two categories: fixed echoes and mobile echoes.

A second step consists in synthesizing a plane image exhibiting the whole set of echoes received, regardless of their Doppler frequency, in a single bearing-distance plane, and in depicting each echo detected by a symbol indicating in particular whether it is fixed or mobile.

A last step consists finally in superimposing on the representation of the echoes a signal reconstituting the panoramic reverberation of the seabed.

The method according to the invention has the advantage of leading to a plane and clear panoramic representation that is easily utilizable by an operator since it is similar to that used for the utilization of sonar systems emitting broad spectrum waves. The image obtained presents the operator with all the useful information all at once. The method according to the invention advantageously utilizes the Doppler effect to obtain an image having a substantially improved contrast which in particular allows the operator to view echoes originating from objects of small size. It also has the advantage of offering the possibility of differentiated display of fixed and mobile echoes. The method according to the invention further has the advantage of affording the operator an image of the reverberation of the seabed, which reverberation constitutes an aid for the utilization of the sonar image.

BRIEF DESCRIPTION OF THE DRAWINGS

Other characteristics and advantages will appear in tandem with the description given in conjunction with the figures which represent.

DETAILED DESCRIPTION

Figure 1:
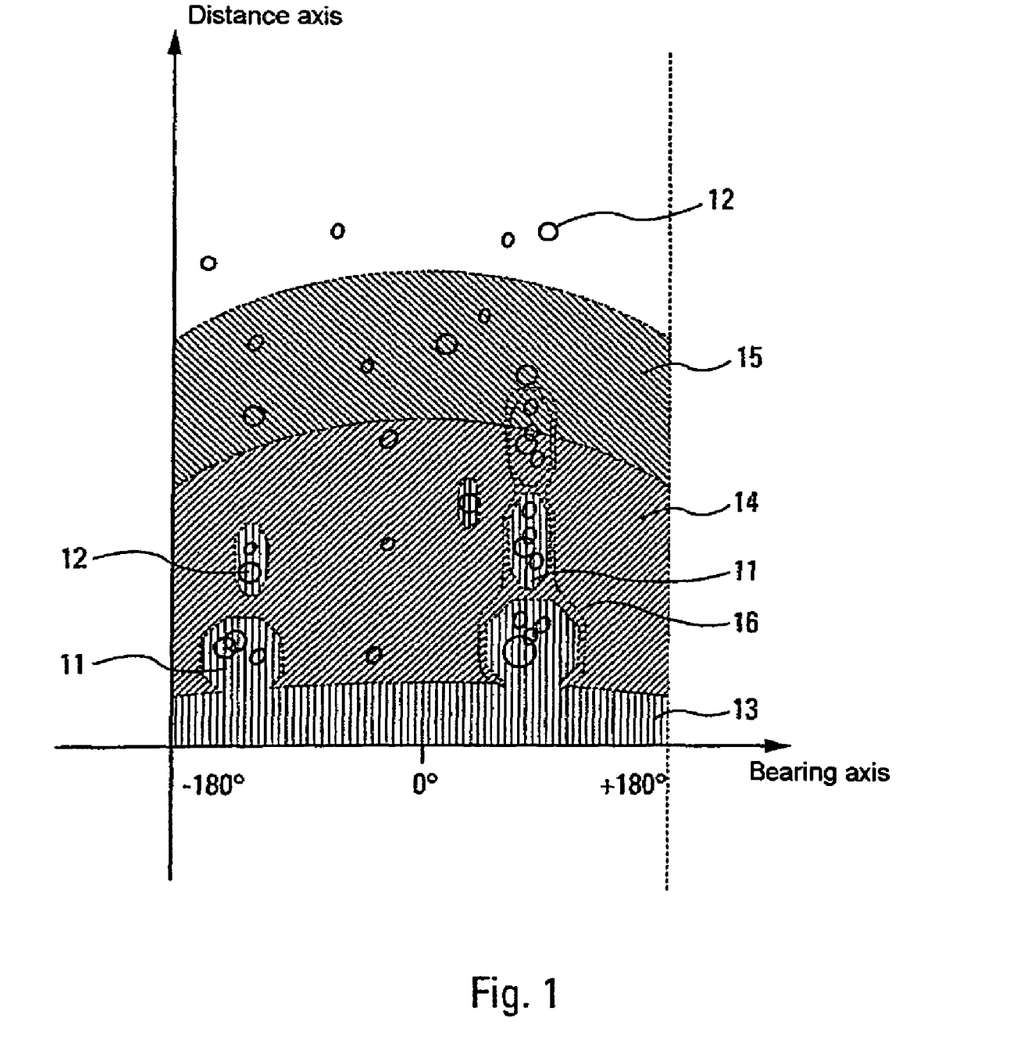
FIG. 1, the diagrammatic illustration of the elements represented on a sonar image, obtained from a conventional sonar emitting a broad spectrum wave.

FIG. 1 presents in a deliberately simplified manner a sonar image such as that obtained by means of an active sonar emitting a signal with hyperbolic frequency modulation or HFM. The image is diagrammatically schematized as a set of areas 11 of variable sizes on which are superimposed geometrical symbols 12. On a real image these areas 11 correspond to zones having a noise or reverberation level situated in a given span. They are generally represented as colored elements, of variable color and size, the color varying for example as a function of the intensity of the echo received. On such an image, the more extensive areas generally represent the reverberation of the sonar wave on the seabed.

The delay and the intensity of the signal received depend in particular on the distance at which the object which returns this echo is situated. Thus in a general manner it is possible to roughly distinguish, as illustrated in the figure, successive zones 13, 14 and 15, for which the intensity of the signal received decreases globally. One and the same underwater relief extending over a certain distance is therefore represented by a succession of contiguous areas 12 of different color or different contrast. The global contour 16 of the whole set of these patches portrays the general contour of the relief considered. For reasons of simplicity, the various areas and zones are represented in FIG. 1 by geometric shapes. In reality, they may have a contour that is both less regular and less precise.

The symbols 12 for their part serve principally to mark the locations at which echoes requiring the attention of the operator have been detected. The detection of these echoes may for example be carried out as a function of an amplitude threshold overshoot by the signal received. In the case of an image obtained by implementing a non-Doppler sonar, the echoes detected are generally represented by symbols of identical shape, for example, in the shape of circles, whose sizes are dependent on the intensity of the echoes detected.

As regards the sonars emitting broadband signals of HFM type, the visualization of the echoes received does not therefore present, a priori, any particular difficulty. Each echo, characterized by its position and its intensity, may be represented without loss of information on a plane image. On the other hand, the utilization of this type of sonar suffers from the limitation introduced by the absence of characterization of the speed of the echoes detected and by an uncertainty in their exact distance, in so far as the speed of the target is unknown. The representation does not therefore reveal the fixed or mobile nature of the echo considered.

Thus as illustrated in FIG. 1, two echoes having different speeds will be represented in an identical manner on a viewing screen. This similarity of representation constrains the operator in the presence of a large number of echoes, to heightened vigilance intended to distinguish fixed echoes from mobile echoes, through successive refreshes of the image.

FIG. 2 illustrates the difficulty stemming from the representation in a plane of the information pertaining to the echoes detected by a sonar, of FP type for example, emitting a line spectrum wave. With this type of sonar it is possible to characterize an echo received as a function of its position and of its Doppler frequency, that is to say the distance and the speed of the object having returned the echo. To obtain a visual representation which simultaneously highlights the speeds of the echoes received, one is led to employ a more complex representation, in three dimensions for example. This representation may for example take the form of a perspective view similar to the illustration of FIG. 2. Such a representation may be likened to a stack of plane representations $p_i$ piled along the bearing/distance axes, each plane representation revealing the areas 22 and the symbols 23 corresponding to the echoes received and to the echoes detected that have one and the same given Doppler frequency fd. Each plane $p_i$ thus constitutes an image on which are positioned areas of various sizes and symbols, the most intense areas corresponding to the reverberation signal for the Doppler frequency considered.

The reverberation, in so far as it may be regarded as a juxtaposition of multiple fixed targets, is affected by a Doppler effect due solely to the motion of the carrier boat. Thus, to within geometrical symmetries, there is a matching of evolution between bearing and Doppler frequency. This correspondence explanes the evolution of the zones 22 from one Doppler plane $p_i$ to the other in FIG. 2.

The number of displayable planes $p_i$ and the Doppler frequency gap $\Delta fd$ between each plane are given by the characteristics of Doppler band analyzed and of Doppler resolution of the sonar used.

Such a representation, although meeting the requirements, appears to be tricky to utilize. Indeed despite the volume effect and even if one uses artifices of colors and of symbols this stack of planes is very difficult to analyze simultaneously. This is why the utilization mode commonly used consists of a plane-by-plane visualization, a single plane $p_i$ being visualized at a time. This mode of utilization is illustrated by FIGS. 3 and 4.

Figure 3:
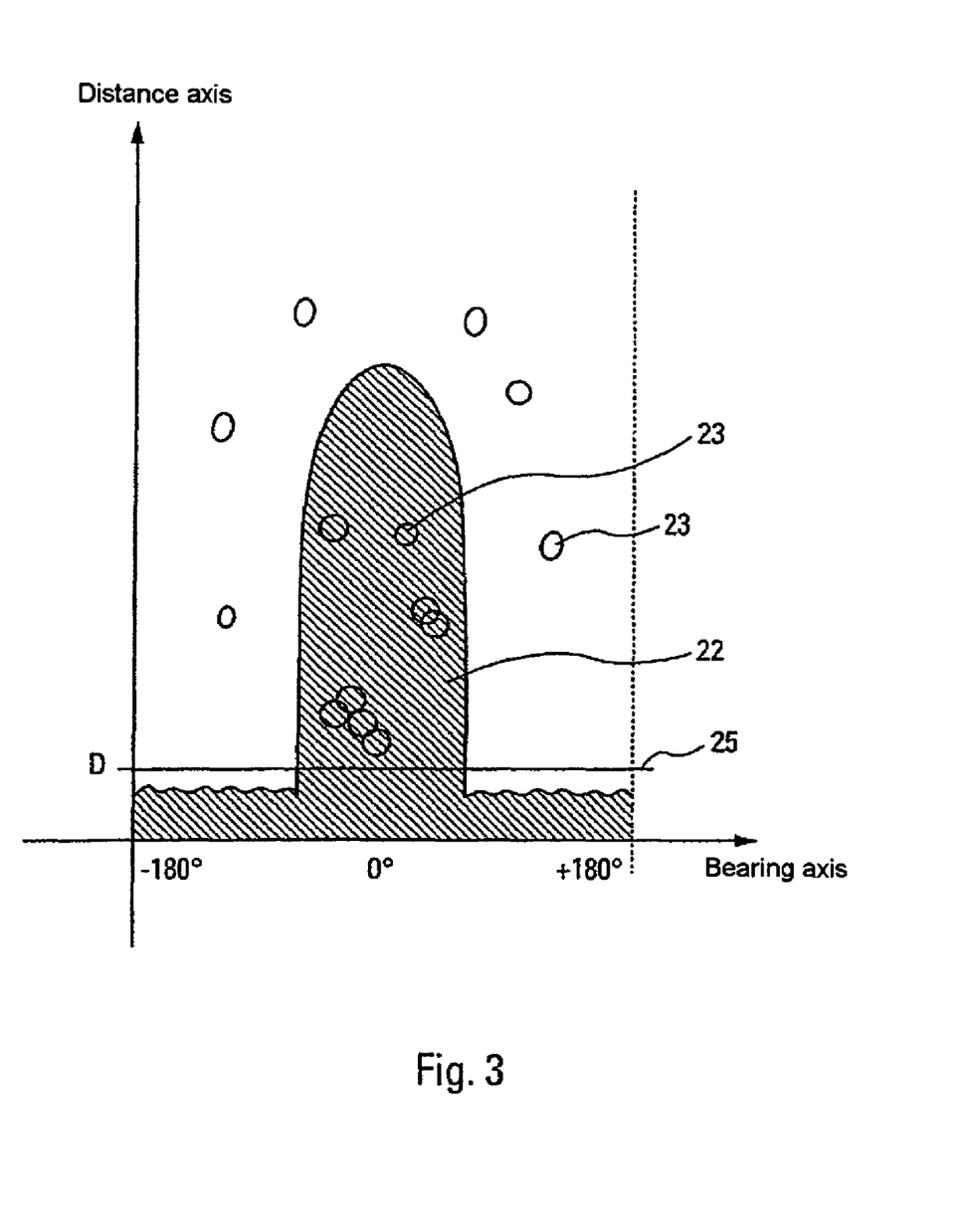
FIG. 3, the diagrammatic representation of a plane image corresponding to the displaying, in a bearing-distance plane $p_1$ mentioned in FIG. 2, of the echoes received having one and the same Doppler frequency.

FIG. 3 presents in a diagrammatic manner the image corresponding to the perspective representation, presented in FIG. 2, of the plane $p_1$. It corresponds for the frequency $fd_1$ to the sonar image provided by a sonar system with line spectrum emission. Represented on this image are the symbols 23 corresponding to the echoes detected whose Doppler frequency is situated in the Doppler resolution zone centered on the frequency $Fd_1$. Likewise, the signal corresponding to the reverberation is represented by the zone 22, which extends over only a part of the bearing axis.

Figure 4:
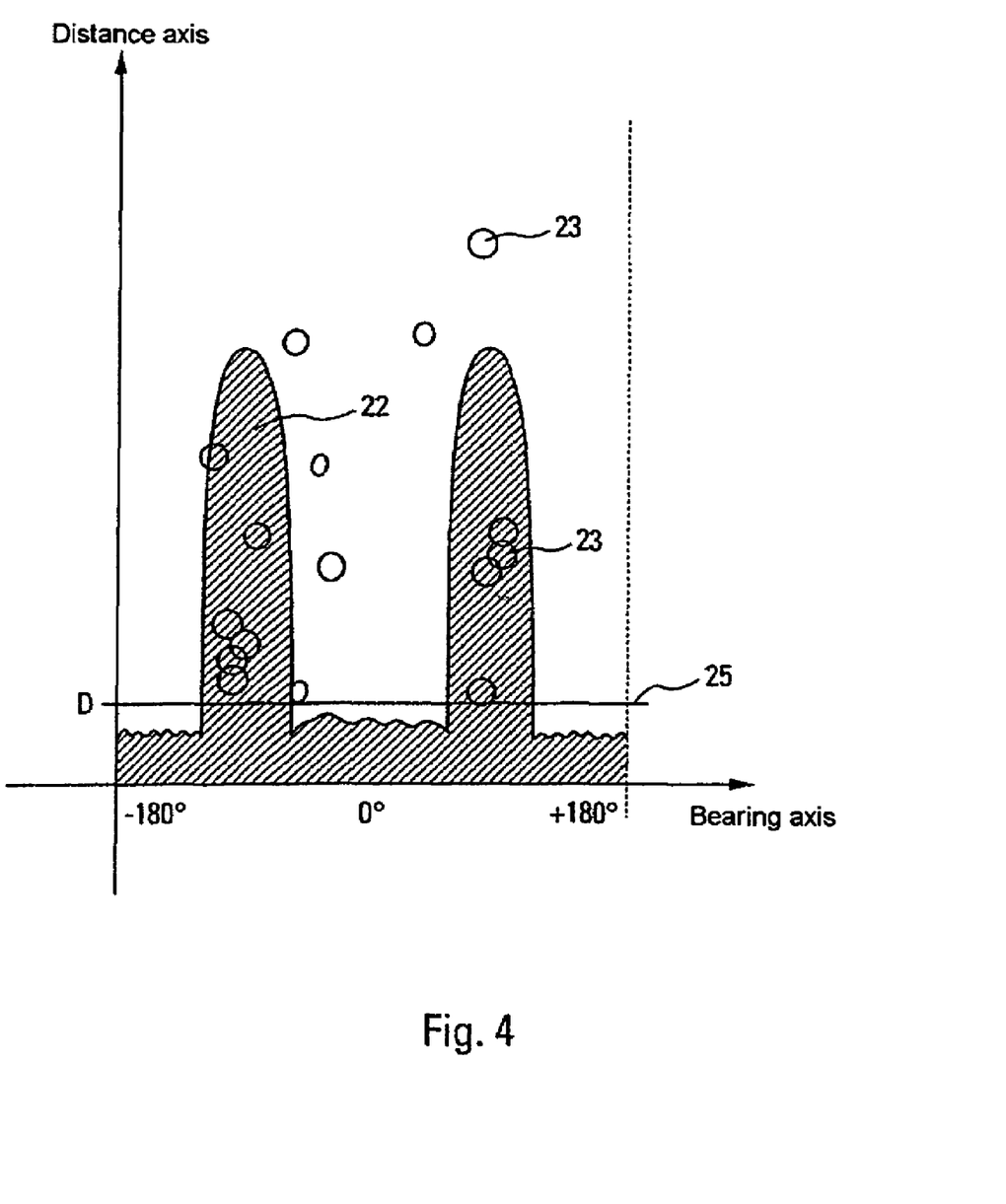
FIG. 4, the diagrammatic representation of a plane image corresponding to the displaying, in a bearing-distance plane $p_2$ mentioned in FIG. 2, of the echoes received having one and the same Doppler frequency.

FIG. 4 for its part presents the image corresponding to the perspective representation, presented in FIG. 2, of the plane $p_2$. Found therein are, as in FIG. 3, symbols 23 and two zones 22 corresponding to the panoramic reverberation.

In the contemporary sonar systems, the operator utilizes the echoes received through images such as those illustrated by FIGS. 3 and 4. The operator can select a given image by displaying for example the value of the Doppler frequency $fd_i$ chosen.

FIGS. 3 and 4 highlight the difficulties related to the use of such a mode of visualization.

The first difficulty pertains to the representation of the signal originating from the panoramic reverberation. Specifically, as may in particular be noted in FIG. 2, the reverberation echoes are distributed over various planes $p_i$. Depending on the plane that is analyzed, the position and the size of the areas 22 which mainly represent the reverberation echoes, vary substantially so that it is not always possible to associate the global contour of a set of patches with that of a reverberation element.

Thus, in FIG. 2, the reverberation signal takes the form in the plane $p_i$ corresponding to the frequency $Fd_1$ of an area centered about the axis corresponding to a bearing of 0°. On the other hand, in the plane $p_2$ corresponding to the frequency $Fd_2$ it takes the form of two lateral areas situated either side of this axis. More generally, the distribution over the bearing axis of the areas which constitute the reverberation in the various planes $p_i$ corresponds to the dashed trace 24.

The restitution of the general aspect of the reverberation can be carried out only by performing the union of the areas corresponding to the panoramic reverberation, which appear in the various planes $p_i$.

The second difficulty of planewise visualization, is a difficulty related to the utilization of the information by the operator. Specifically in an ordinary context, the representation in three dimensions is not possible with the hardware used. The operator can have access to only one plane image such as those of FIGS. 3 and 4, corresponding to a given plane $p_i$. Thus to view the whole set of echoes present the operator is led to display the various images corresponding to the set of planes $p_i$ successively. This operation of successive displays turns out to be at one and the same time irksome, rather ineffectual in terms of monitoring and incompatible with real time utilization. To make it easier to some extent to select the image visualized, the operator generally avails himself of the possibility of displaying a complementary image. This image consists in the representation in the bearing-Doppler plane, for a distance D selectable by the operator, of the echoes detected and of the reverberation echoes. This representation is illustrated by FIG. 5.

The illustration of FIG. 5 presents a sectional view, in the bearing-Doppler plane, of the illustration of FIG. 2; the section being a cut along a plane perpendicular to the planes $p_i$ and passing through a straight line 25, situated for example at a distance D from the sonar. The image exhibits symbols 22 corresponding to echoes detected having different Doppler frequencies and situated at one and the same distance D, as well as a zone 24 corresponding in particular to the panoramic reverberation.

As illustrated in FIG. 5, the reverberation is demarcated by a large number of echoes whose Doppler frequency varies as a function of the bearing in the Doppler band of the sonar, thus forming the zone 24. This finding can moreover be generalized to any bearing-Doppler image corresponding to a plane passing through a straight line situated at a distance D corresponding to the zone of detection of the seabed by the sonar.

The utilization of commonly used sonar systems with line spectrum emission consists generally in associating the image corresponding to a representation in the bearing distance plane for a given Doppler frequency, with that corresponding to a representation in the bearing-Doppler plane for a given distance. The association of two images is generally made easier by the establishing of automatic relationships between the two types of images. These systems thus make it possible, for example, to select by means of a cursor, on the bearing-Doppler representation corresponding to a distance $D_1$, a given Doppler frequency $fd_1$ and to view the bearing-distance representation corresponding to the frequency $fd_1$. Conversely, the same systems make it possible to select a distance $D_2$ on the bearing-distance representation and to view the corresponding bearing-Doppler representation. Nevertheless this type of manipulation of images remains irksome and too slow for genuine real time utilization.

To allow fast and effectual utilization of the echoes received and to benefit at the same time from good restitution of the panoramic reverberation, the method according to the invention proposes a different utilization of the information obtained in particular by the Doppler processing.

The method according to the invention consists in producing a synthetic image in a bearing-distance plane, representing in the form of symbols all the echoes detected. The shape or the nature of the symbols used by the method to represent an echo differs depending on whether the echo is fixed or mobile. Also featured in this synthetic image are areas devised artificially, intended to faithfully reconstitute the panoramic reverberation in such a way that the operator has an appreciation of the reverberation allowing him to easily analyze the echoes displayed.

Figure 6:
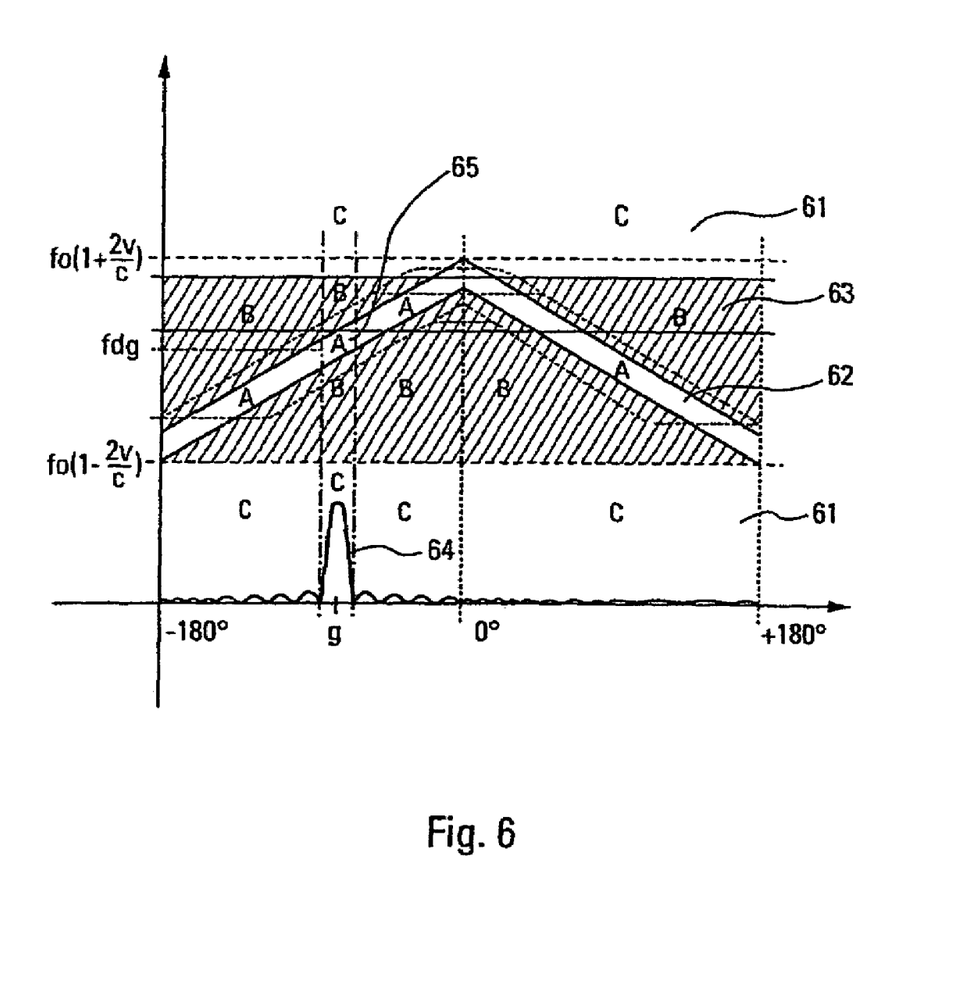
FIG. 6, an illustration exhibiting a partition of the bearing-Doppler plane into various zones, which partition is utilized by the method according to the invention.

The illustration of FIG. 6 illustrates the principle on which the method according to the invention is based. It presents, for any given distance, a partition of a bearing-Doppler representation plane of the echoes received such as that presented in FIG. 5. This partition is carried out by associating the Doppler frequency of the echoes, with the speed and the position of the objects that have returned these echoes.

When one speaks of the speed of the echoes, one is generally referring to the Doppler frequency which affects the frequency of the signal reflected by an object situated in the sector insonified by the sonar. This Doppler frequency is dependent on the relative radial speed of the object with respect to the sonar's carrier ship. It is also dependent on the bearing in which the object is situated, the bearing representing the angular gap between the straight line joining the sonar to the object and the heading followed by the carrier ship.

Calculations conducted elsewhere show that regardless of the object, the Doppler frequency fd of the echo lies between the values $fd_{min}=f_0(1-2\ v/c)$ and $fd_{max}=f_0(1+2\ v/c)$, where v represents the speed of the carrier ship along its heading, c the speed of propagation of the acoustic wave in the medium and where $f_0$ symbolizes the emission frequency of the sonar.

Moreover it is also shown that the Doppler frequency fd decreases from $fd_{max}$ to $fd_{min}$, in a substantially linear manner, as the value of the cosine of the bearing increases in absolute value.

Consequently, as illustrated in FIG. 6, it is possible in a representation of the echoes in a bearing-Doppler plane to distinguish three zones. The first zone 61, dubbed "zone C", corresponds to the part of the Doppler domain for which no Doppler frequency can correspond to a fixed echo. This zone is situated on either side of the domain lying between $fd_{max}$ and $fd_{min}$ and extends over the bearing axis from $-180°$ to $+180°$.

Conversely, the zone 62 dubbed "zone A", corresponds to the part of the Doppler domain in which the Doppler frequencies corresponding to fixed echoes are distributed as a function of bearing. This zone takes the form of a narrow band shaped like a chevron extending over a bearing of from $-180°$ to $+180°$ and whose amplitude varies from $fd_{max}$ to $fd_{min}$. The width of the band A is in particular dependent on the frequency resolution of the sonar. The remainder of the domain lying between $fd_{max}$ and $fd_{min}$ and not corresponding to the zone A constitutes the zone 63 dubbed "zone B".

FIG. 6 elucidates the benefit of the splitting into zones A, B and C through the particular example of a sonar one of whose reception channels of angular aperture $\Delta g$, is oriented in the bearing g. This reception channel is symbolized by the chart 64.

For this particular reception channel, a fixed echo will be affected by a Doppler frequency $Fd_g$ contained in the part 65 of the zone A of width $\Delta g$ about g. On the other hand for another reception channel oriented in a bearing g', a fixed echo will be affected by a Doppler frequency $Fd_{g'}$ contained in another part of the zone A of width $\Delta g$ about g'. Thus, the echo of a fixed object exhibiting a certain extent in bearing, as is the case of a relief of the seabed for example, will be detected through several reception channels and will be affected by a different Doppler frequency for each channel.

Hence when such an echo is represented as in FIGS. 3 and 4, in a bearing-distance plane $p_i$, for a given Doppler frequency, it forms the subject of a partial representation which may impede its correct identification by an operator. Likewise, the extended echo originating from the reverberation of the seabed forms the subject of a partial representation in each of the bearing-distance planes $p_i$.

The principle of identification of the echoes received by whether they belong to one of the zones A, B and C, is exploited by the method according to the invention in two ways.

Firstly the echoes detected are classed into fixed or mobile echoes depending on whether their Doppler frequency belongs to zone A or to one of the zones B or C. The detected echoes thus classed may be represented in a bearing-distance plane by distinct symbols.

Moreover, the reverberation signal of the seabed, by nature extensive, corresponds to a multitude of echoes whose Doppler frequencies belong to zone A. It is therefore possible to produce a representation of the reverberation in a bearing-distance plane by displaying for each interval of bearing Δg the image of the signal whose Doppler frequency is contained in zone A.

Figure 7:
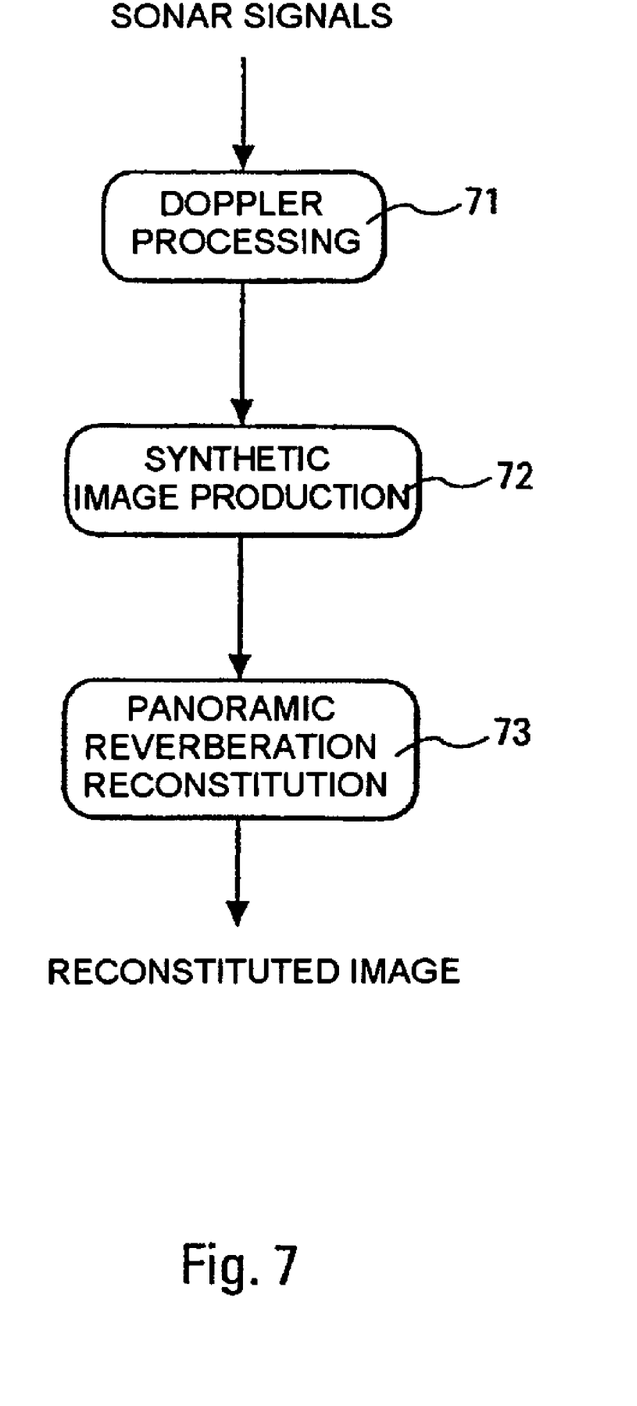
FIG. 7, a simplified flowchart of the method according to the invention.

FIG. 7 presents in the form of a flowchart the succession of the main steps of which the method according to the invention is composed. The flowchart proposed is given by way of example, the method being implementable according to slight variants or else enhanced with supplementary steps.

The method according to the invention thus comprises a first step 71 of Doppler processing and of detection which makes it possible in particular to distinguish the echoes whose level overshoots a given detection threshold and to class the echoes detected into fixed echoes and mobile echoes.

The method then comprises a second step 72 of producing a synthetic sonar image positioning the echoes detected in a bearing-distance plane. Each echo is depicted by a symbol, this symbol employed being different depending on whether the echo is fixed or mobile. The size of the symbol is moreover dependent on the level of the echo received.

The method finally comprises a third step 73, consisting in restoring on the synthetic image a reconstituted representation of the reverberation, and in particular of the reverberation of the seabed. This reconstitution is effected by displaying on the image the whole set of echoes whose Doppler frequency is situated for each reception channel in the middle of the corresponding part 65 of zone A.

Figure 8:
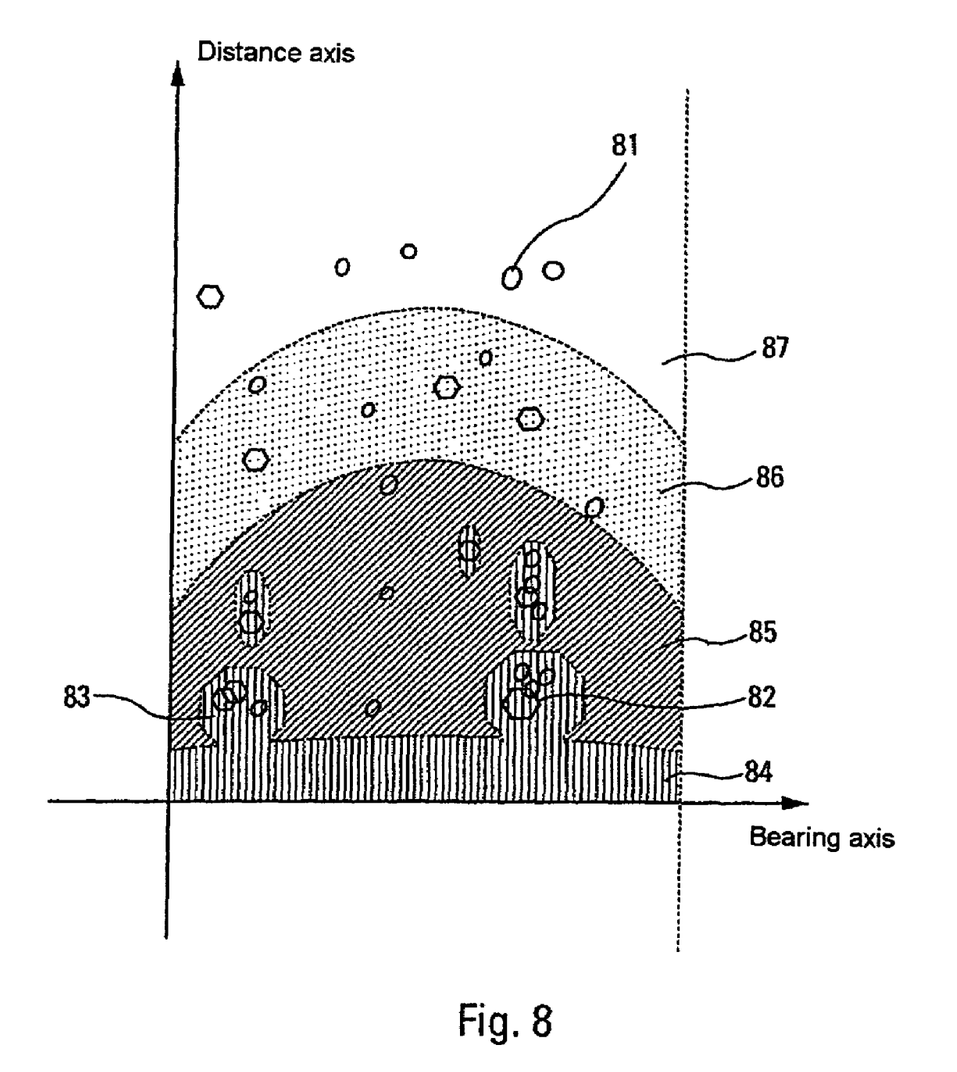
FIG. 8, a illustration of the image obtained by the method according to the invention.

FIG. 8 gives a diagrammatic representation of the image obtained. This image is to be compared with the images known from the prior art, both that of FIG. 1 which presents a sonar image obtained with a sonar system with broad spectrum emission, and also that of FIGS. 3 and 4 which presents the partial images obtained for particular Doppler frequencies, with a sonar system with line spectrum emission.

On the image represented in FIG. 8 can be distinguished symbols 81 and 82 which respectively represent mobile and fixed detected echoes. This distinction between fixed and mobile echoes is achieved by the displaying of different symbols. It is rendered advantageously possible by virtue of the use of the Doppler processing by the method according to the invention.

The image of FIG. 8 also comprises areas 83 corresponding to zones of reverberation whose visual association gives a representation of extensive elements, such as for example elements of relief constituting the panoramic reverberation of the seabed. These patches are reconstituted as indicated previously from the echoes of zone A. This image thus advantageously restores a representation of the elements constituting the reverberation. It allows the operator to analyze the echoes detected, as is possible on an image of a sonar system with broad spectrum such as the image represented diagrammatically in FIG. 1, but having knowledge of the presence if any of relief elements in proximity.

In so far as the signals of zone A are represented therein, the image of FIG. 8 presents an image of the reverberation of the seabed whose level decreases in a more or less regular manner as a function of distance. This image is represented in an approximate manner in the form of zones 84 to 87.

The method according to the invention therefore makes it possible to combine the legibility advantages presented by the sonar images obtained from a sonar with broad spectrum emission with the advantages related to the utilization of the Doppler effect by sonars with line spectrum emission. One thus obtains on a single image represented in the bearing-Doppler plane a differentiated representation of the fixed and mobile echoes detected, which representation also portrays a reconstituted presentation of the bed reverberation, surface reverberation or volume reverberation.

The invention claimed is:

1. A method of visualizing echoes received by an active sonar transmitting a line spectrum waveform, said method comprising the steps of:
    Doppler processing the received signals, and detecting echoes,
    generating an artificial sonar image positioning the detected echoes in a range-bearing plane, and
    supplementing said artificial image with a representation of a reverberation level at each point of said range-bearing plane.

2. The method as claimed in claim 1, wherein the step of supplementing said artificial image is carried out by displaying for each point of the image, tagged by its distance and its bearing, the echo whose Doppler frequency is situated at the center of a zone A corresponding to the Doppler frequencies relating to the fixed echoes.

3. The method as claimed in claim 1, wherein the detected echoes are represented on the artificial image by areas whose color and size depend on the level and of the duration of the echoes received.

4. The method as claimed in claim 2, wherein the detected echoes are represented on the artificial image by areas whose color and size depend on the level and of the duration of the echoes received and on their fixed or mobile character.

5. The method as claimed in claim 4, wherein the detected echoes are highlighted on the artificial image by means of symbols, these symbols making it possible to distinguish the mobile echoes from the fixed echoes.

* * * * *